US012760951B2

(12) United States Patent
Kim

(10) Patent No.: US 12,760,951 B2
(45) Date of Patent: Oct. 13, 2026

(54) ICE-MAKING EVAPORATOR AND METHOD FOR MANUFACTURING ICE-MAKING EVAPORATOR

(71) Applicant: COWAY CO., LTD., Gongju-si (KR)

(72) Inventor: Jae Man Kim, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 108 days.

(21) Appl. No.: 18/873,529

(22) PCT Filed: Jul. 14, 2023

(86) PCT No.: PCT/KR2023/010128
§ 371 (c)(1),
(2) Date: Dec. 10, 2024

(87) PCT Pub. No.: WO2024/048991
PCT Pub. Date: Mar. 7, 2024

(65) Prior Publication Data

US 2026/0071799 A1 Mar. 12, 2026

(30) Foreign Application Priority Data

Aug. 29, 2022 (KR) ........................ 10-2022-0108367

(51) Int. Cl.
*F25C 1/08* (2006.01)
*B23P 15/26* (2006.01)
*F25B 39/02* (2006.01)
*F28D 21/00* (2006.01)
*F28F 9/22* (2006.01)

(52) U.S. Cl.
CPC ................ *F25C 1/08* (2013.01); *B23P 15/26* (2013.01); *F25B 39/02* (2013.01); *F28F 9/22* (2013.01); *F25B 2339/0242* (2013.01); *F28D 2021/0071* (2013.01); *F28F 2009/226* (2013.01)

(58) Field of Classification Search
CPC ..... F25C 1/08; F25B 39/02; F28F 9/22; F28F 2009/224; F28F 2009/226
See application file for complete search history.

(56) References Cited

U.S. PATENT DOCUMENTS

2022/0034571 A1 2/2022 Lee et al.

FOREIGN PATENT DOCUMENTS

| | | |
|---|---|---|
| EP | 3 851 765 A1 | 7/2021 |
| GB | 2146108 | 4/1985 |
| JP | 10-267585 A | 10/1998 |
| JP | 2004-12386 | 1/2004 |

(Continued)

OTHER PUBLICATIONS

Japanese Office Action issued Jan. 20, 2026, in corresponding Japanese Patent Application No. 2025-501267 (with English Translation), 18 pages.

(Continued)

*Primary Examiner* — Christopher R Zerphey
(74) *Attorney, Agent, or Firm* — Oblon, McClelland, Maier & Neustadt, L.L.P.

(57) ABSTRACT

An ice-making evaporator has internal spaces of an evaporator main body and an ice-making member partitioned into a plurality of spaces. Refrigerant may be circulated in the partitioned plurality of spaces to cool the ice-making member, thereby increasing the contact time between the refrigerant and the ice-making member, and sufficiently exhibiting the cooling capacity of the refrigerant.

19 Claims, 17 Drawing Sheets

(56) References Cited

FOREIGN PATENT DOCUMENTS

| | | | |
|---|---|---|---|
| JP | 2008-64450 | | 3/2008 |
| JP | 2011-158110 | A | 8/2011 |
| JP | 2013-142524 | A | 7/2013 |
| JP | 2014-126273 | A | 7/2014 |
| JP | 2015-55411 | A | 3/2015 |
| KR | 10-1337080 | B1 | 12/2013 |
| KR | 10-2016-0089324 | A | 7/2016 |
| KR | 10-2021-0001340 | | 1/2021 |
| KR | 10-2021-0003525 | A | 1/2021 |
| KR | 10-2024-0029957 | A | 3/2024 |
| WO | WO 2015/097876 | A1 | 7/2015 |
| WO | WO 2024/048991 | A1 | 3/2024 |

OTHER PUBLICATIONS

International Search Report issued Oct. 24, 2023, in PCT Application No. PCT/KR2023/010128 filed Jul. 14, 2023, 3 pages.
Notice of Allowance issued in Japanese Patent Application No. 2025-501267, issued Aug. 4, 2026, citing documents 1-4 therein.

ICE-MAKING EVAPORATOR AND METHOD FOR MANUFACTURING ICE-MAKING EVAPORATOR

CROSS-REFERENCE TO RELATED APPLICATIONS

The present application is a national phase application, claiming priority under § 365 (c), of International Application No. PCT/KR2023/010128, filed on Jul. 14, 2023, which is based on and claims the benefit of Korean Patent Application No. 10-2022-0108367, filed on Aug. 29, 2022, in the Korean Intellectual Property Office, the content and disclosure of each of which are incorporated by reference herein in their entirety.

TECHNICAL FIELD

The present invention relates to an ice-making evaporator and a method for manufacturing an ice-making evaporator, and more specifically, to an ice-making evaporator in which refrigerant circulates inside to make ice and a method for manufacturing an ice-making evaporator.

BACKGROUND

In general, an ice maker is a device that cools water below the freezing point of 0° C. to make ice and supplies it to users. Such an ice maker may be applied to a refrigerator or an ice water purifier that requires ice. In general, such an ice maker includes an ice-making evaporator including an evaporation tube through which refrigerant flows and an ice-making member cooled by the refrigerant.

The ice maker includes an immersion type ice maker that allows the ice-making member to be submerged in water to create ice in the ice-making member, a spray type ice maker that sprays water to the ice-making member to create ice in the ice-making frame, or a flow type ice maker that allows water to flow through the outer circumferential surface of the ice-making member to create ice in the ice-making member.

A conventional ice maker for ice making is disclosed in Coway Co., Ltd.'s U.S. Patent Laid-Open Publication No. 2020-0020309. Such an ice-making evaporator is configured so that the refrigerant flows through the inner space of the evaporator main body and the immersion member to produce ice, and the heating member disposed in the inner space heats the refrigerant to de-ice the ice.

However, since the ice-making evaporator does not have a structure in which the refrigerant circulates the internal space of the immersion member, there is a problem in that the contact time between the refrigerant and the immersion member is not long, so it is difficult to sufficiently exhibit the cooling capacity of the refrigerant.

In addition, if there are multiple immersion members in such an ice-making evaporator, the cooling capacity of the refrigerant is not evenly distributed to the multiple immersion members, so the size of the ice produced varies depending on the location of the ice-making member.

In addition, such an ice-making evaporator has many types of components, such as a separate heating member installed inside the evaporator main body, and the shape of the components and the arrangement and coupling structure between the components are complicated, which requires a lot of manufacturing cost.

A conventional ice-making evaporator is disclosed in Coway Co., Ltd.'s Korean Patent Laid-Open Publication No. 2021-0003525. Such an ice-making evaporator is configured so that the internal spaces of the evaporation tube and the immersion member is partitioned by the partition member, and the refrigerant circulates through the partitioned internal space to prepare ice, and the separately provided heating member heats the refrigerant to de-ice the ice.

However, since such an ice-making evaporator is not a structure that can confirm whether the internal spaces of the evaporation tube and the immersion member partitioned by the partition member are fluidly isolated from each other, there is a problem that the refrigerant introduced into the evaporation tube may directly flow out of the evaporator without circulating the immersion member, so that it is not possible to prevent the manufacture of defective products with poor ice-making performance.

In addition, such an ice-making evaporator has a large manufacturing cost because the evaporation tube is formed of multiple members, the components that divide the inside of the evaporation tube and the components that divide the inside of the immersion member are provided as one member, and a separate heating member must be installed for de-icing, and thus, the shape of the components and the coupling relationship between the components are complicated, which requires a lot of manufacturing cost.

The present invention has been devised in view of the above problems, and the present invention is directed to providing an ice-making evaporator in which internal spaces of an evaporator main body and an ice-making member are partitioned into a plurality of spaces, refrigerant can be circulated in the partitioned plurality of spaces to cool the ice-making member, thereby increasing the contact time between the refrigerant and the ice-making member, and sufficiently exhibiting the cooling capacity of the refrigerant.

The present invention is also directed to providing an ice-making evaporator in which the internal space of the plurality of ice-making member is partitioned into a plurality of spaces, refrigerant can sequentially pass through the partitioned plurality of internal spaces of the ice-making member to cool the plurality of ice-making members, whereby the cooling capacity of the refrigerant can be evenly distributed to the plurality of ice-making members and ice with a uniform size can be formed for each of the plurality of ice-making members.

The present invention is also directed to providing an ice-making evaporator that can prevent the manufacture of defective products with poor ice-making performance by checking whether the internal spaces of the evaporator main body and the ice-making member are fluidly isolated from each other by a dividing wall.

The present invention is also directed to providing an ice-making evaporator that can improve the manufacturing convenience and assimilability between the components by providing a separation member that partitions the internal spaces of the evaporator main body and the ice-making space in plurality, and configuring the provided members to be sequentially assembled and coupled to each other.

The present invention is also directed to providing an ice-making evaporator that can increase manufacturing convenience and reduce manufacturing cost by simplifying the shape of components constituting the ice-making evaporator and the coupling structure between the components without including a separate heating member.

The present invention is also directed to providing a method for manufacturing an ice-making evaporator that is configured to check whether the internal spaces of the ice-making evaporator are partitioned from each other to prevent the manufacture of defective products with poor ice-making performance.

The present invention is also directed to providing a method for manufacturing an ice-making evaporator that can increase manufacturing convenience and reduce manufacturing cost by simplifying the shape of the components and the coupling structure between the components and sequentially performing the assembly and coupling processes without including a separate heating member.

The problems of the present invention are not limited to those mentioned above, and other problems not mentioned will be clearly understood by those of ordinary skill in the art from the following description.

According to an aspect of the present invention, provided is an ice-making evaporator, including an evaporator main body having a main body space extending in one direction to allow refrigerant to flow; a main body space-dividing wall extending in the same direction as the main body space to partition the main body space into a first main body space and a second main body space; an ice-making member having a heat exchange space that is formed to extend in a direction different from the extension direction of the main body space and is in fluid communication with the main body space; a heat exchange space-dividing wall extending in the same direction as the ice-making member and dividing the heat exchange space into a first heat exchange space in fluid communication with the first main body space and a second heat exchange space in fluid communication with the second main body space; a refrigerant inflow path connected to the first main body space to make the refrigerant flow into the first main body space; and an outflow path connected to the second main body space to make the refrigerant flowing in the second main body space flow out, wherein a circling space for allowing the refrigerant to flow from the first main body space to the second main body space is provided in the evaporator main body, and wherein a partition member is provided between the main body space and the circling space to partition the main body space and the circling space and includes a first hole connecting the first main body space and the circling space so that the first main body space and the circling space are in fluid communication, and a second hole connecting the second main body space and the circling space so that the second main body space and the circling space are in fluid communication.

In this case, the partition member may include a body part that partitions the main body space and the circling space and in which the first hole and the second hole are formed; and an extension formed to extend from a circumference of the body part toward the circling space and having an outer surface in contact with an inner wall of the evaporator main body.

In this case, a coupling hole in fluid communication with the main body space may be formed in the evaporator main body, and the ice-making member may be coupled to the coupling hole.

In this case, the ice-making member may include a cylindrical ice-making part and a bottom part provided at one end of the ice-making part to close one end of the heat exchange space, and the bottom part may be formed to be convex outward.

In this case, the ice-making member may be formed to extend in a direction perpendicular to the extension direction of the main body space.

In this case, the main body space-dividing wall and the heat exchange space-dividing wall may be disposed side by side on the same plane.

In this case, the ice-making evaporator may further include a guide wall coupled to the main body space-dividing wall, and the guide wall may include a first main body space-side guide part disposed in the first main body space to guide the refrigerant flowing from one end to the other end of the first main body space to pass through the first heat exchange space.

In this case, the guide wall and the main body space-dividing wall may be arranged perpendicular to each other.

In this case, the guide wall may include a second main body space-side guide part disposed in the second main body space to guide the refrigerant flowing from one end to the other end of the second main body space to pass through the second heat exchange space.

In this case, the guide wall may include a first heat exchange space-side guide part disposed in the heat exchange space to partition the first heat exchange space into a first passing space and a second passing space.

In this case, the first heat exchange space-side guide part may be formed to extend along the heat exchange space to guide the refrigerant flowing in the first heat exchange space in the extension direction of the ice-making member.

In this case, a flow hole connecting the first passing space and the second passing space to fluidly communicate may be defined in the first heat exchange space-side guide part.

In this case, the flow hole may be located biased toward one end of the ice-making member.

In this case, a guide wall coupling groove to which the guide wall may be coupled is formed at a side part in the extension direction of the main body space-dividing wall, and a main body space-dividing wall coupling groove correspondingly coupled to the guide wall coupling groove may be formed at one end, toward the main body space, of the guide wall.

In this case, the heat exchange space-dividing wall may be coupled to the guide wall.

In this case, a guide wall coupling groove to which the guide wall is coupled may be formed at one end, toward the main body space, of the heat exchange space-dividing wall, and a heat exchange space-dividing wall coupling groove correspondingly coupled to the guide wall coupling groove may be formed at the other end in the other direction of the guide wall.

In this case, the first and second main body spaces may extend side by side to each other, and the circling space may be located at one end of the main body space.

In this case, the ice-making evaporator may further include a heat gas inflow path connected to the first main body space to make heated gas flow into the first main body space.

In this case, the ice-making member may be provided in plurality, and the plurality of ice-making members may be arranged along the extension direction of the main body space.

According to another aspect of the present invention, provided is a method for manufacturing an ice-making evaporator, the method including providing an evaporator assembly having first and second inspection target spaces partitioned between each other and having a circling space in which one side is fluidly connected to the first and second inspection target spaces and the other side is open to the outside of the circling space; inspecting whether the first inspection target space and the second inspection target space are fluidly isolated from each other; and closing the open other side of the circling space based on a result obtained by the inspecting whether isolated.

In this case, the providing an evaporator assembly may include providing an evaporator main body having a main body space; providing an ice-making member having a heat exchange space; arranging the evaporator main body and the ice-making member adjacent to each other so that the main body space and the heat exchange space are in fluid communication with each other, and partitioning the main body space and the heat exchange space to form the first and second inspection target spaces; and combining the evaporator main body and the ice-making member to form an evaporator assembly.

In this case, the forming the first and second inspection target spaces may include arranging a main body space-dividing wall for partitioning the main body space into a first main body space and a second main body space, in the main body space; arranging a heat exchange space-dividing wall for partitioning the heat exchange space into a first heat exchange space and a second heat exchange space, on one side of the main body space-dividing wall; arranging the ice-making member adjacent to the evaporator main body so that the heat exchange space-dividing wall is arranged in the heat exchange space; and connecting the first main body space and the first heat exchange space to fluidly communicate with each other to form a first inspection target space, and connecting the second main body space and the second heat exchange space to fluidly communicate with each other to form a second inspection target space.

In this case, the forming the first and second inspection target spaces may include providing a guide wall for guiding fluid flowing in the main body space to the heat exchange space; assembling the guide wall to the main body space-dividing wall; and assembling the heat exchange space-dividing wall to the guide wall.

In this case, the inspecting whether isolated may include arranging a partition member having a first hole connecting the first inspection target space and the circling space to fluidly communicate with each other, and a second hole connecting the first inspection target space and the circling space to fluidly communicate with each other, between the first and second inspection target spaces and the circling space; closing the first hole to fluidly isolate the first inspection target space and the circling space from each other; checking the characteristics of the first and second inspection target spaces; and checking whether the first inspection target space and the second inspection target space are fluidly isolated from each other based on the identified result.

In this case, the checking the characteristics of the inspection target spaces may include injecting a predetermined fluid into the first inspection target space; and checking the state of the injected fluid.

In this case, in the checking the state of the injected fluid, it may be checked whether the fluid injected into the first inspection target space leaks into the second inspection target space.

The ice-making evaporator according to an exemplary embodiment of the present invention is configured such that a dividing wall partitions the internal spaces of the evaporator main body and the ice-making member into a plurality of spaces so that refrigerant is circulated in the partitioned plurality of spaces to cool the ice-making member, thereby increasing the contact time between the refrigerant and the ice-making member, and sufficiently exhibiting the cooling capacity of the refrigerant.

The ice-making evaporator according to an exemplary embodiment of the present invention is configured such that a dividing wall partitions the internal space of the plurality of ice-making member into a plurality of spaces so that refrigerant can sequentially pass through the partitioned plurality of internal spaces of the ice-making member to cool the plurality of ice-making members, whereby the cooling capacity of the refrigerant can be evenly distributed to the plurality of ice-making members and ice with a uniform size can be formed for each of the plurality of ice-making members.

The ice-making evaporator according to an exemplary embodiment of the present invention is configured such that the partition member can be used to check whether the internal spaces of the evaporator main body and the ice-making member are fluidly isolated from each other by a dividing wall, thereby preventing the manufacture of an evaporator with poor ice-making performance, that is, defective products.

In the ice-making evaporator according to an exemplary embodiment of the present invention, the dividing wall can be provided separately as a main body space-dividing wall that can be inserted to divide the inner space of the evaporator main body and a heat exchange space-dividing wall to divide the inner space of the ice-making member, and then assembled, thereby increasing manufacturing convenience and reducing manufacturing cost.

In the ice-making evaporator according to an exemplary embodiment of the present invention, the separation member that divides the interior of the evaporator main body and the ice-making space is made up of a main body space-dividing wall, a heat exchange space-dividing wall, and a guide wall that are separately provided, and a plurality of coupling grooves correspondingly coupled to each other to be sequentially assembled and coupled to each other are provided on the main body space-dividing wall, the heat exchange space-dividing wall, and the guide wall, thereby improving the manufacturing convenience and assimilability between the components.

The ice-making evaporator according to an exemplary embodiment of the present invention does not include a separate heating member, and the shape of components and the coupling structure between the components are simple, thereby increasing manufacturing convenience and reducing manufacturing cost.

The method for manufacturing an ice-making evaporator according to an exemplary embodiment of the present invention is configured to check whether the internal spaces of the ice-making evaporator are partitioned from each other using a partition member, thereby preventing the manufacture of an evaporator with poor ice-making performance, that is, defective products.

In the method for manufacturing an ice-making evaporator according to an exemplary embodiment of the present invention, the shape of the provided components and the coupling structure between the components are simple, and the components are combined through a sequential assembly process, thereby increasing manufacturing convenience and improving assimilability between the components.

Advantageous effects of embodiments of the present invention are not limited to the above-described effects, and other effects not mentioned will be clearly understood by those of ordinary skill in the art from the present specification and the accompanying drawings.

DETAILED DESCRIPTION OF THE EMBODIMENTS

Terms and words used in the present specification and claims should not be construed as limited to their usual or dictionary definition. They should be interpreted as meaning and concepts consistent with the technical idea of the present invention, based on the principle that inventors may appropriately define the terms and concepts to describe their own invention in the best way.

It should be understood that the terms "comprise or include" or "have" or the like when used in this specification, are intended to describe the presence of stated features, numbers, steps, operations, elements, components and/or a combination thereof but not preclude the possibility of the presence or addition of one or more other features, numbers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Figure 1:
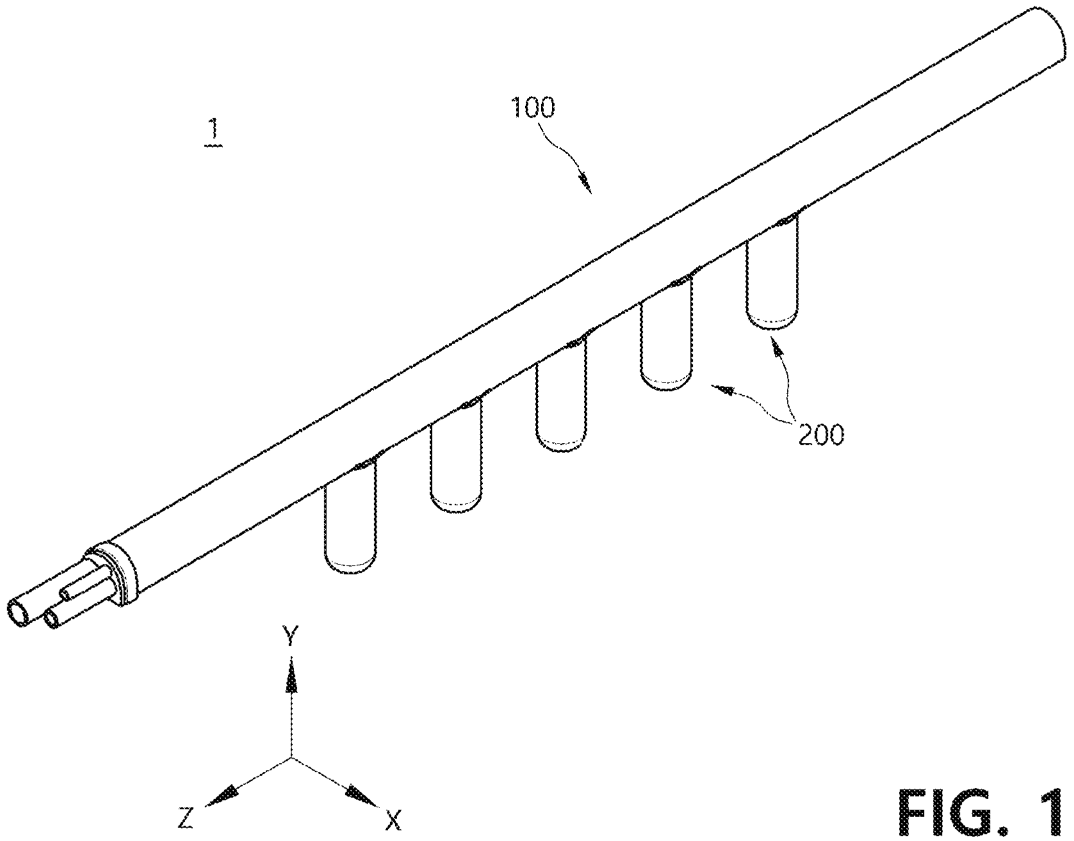
FIGS. 1 and 2 are perspective views of an ice-making evaporator according to an exemplary embodiment of the present invention, viewed from an upper side.
Figure 2:
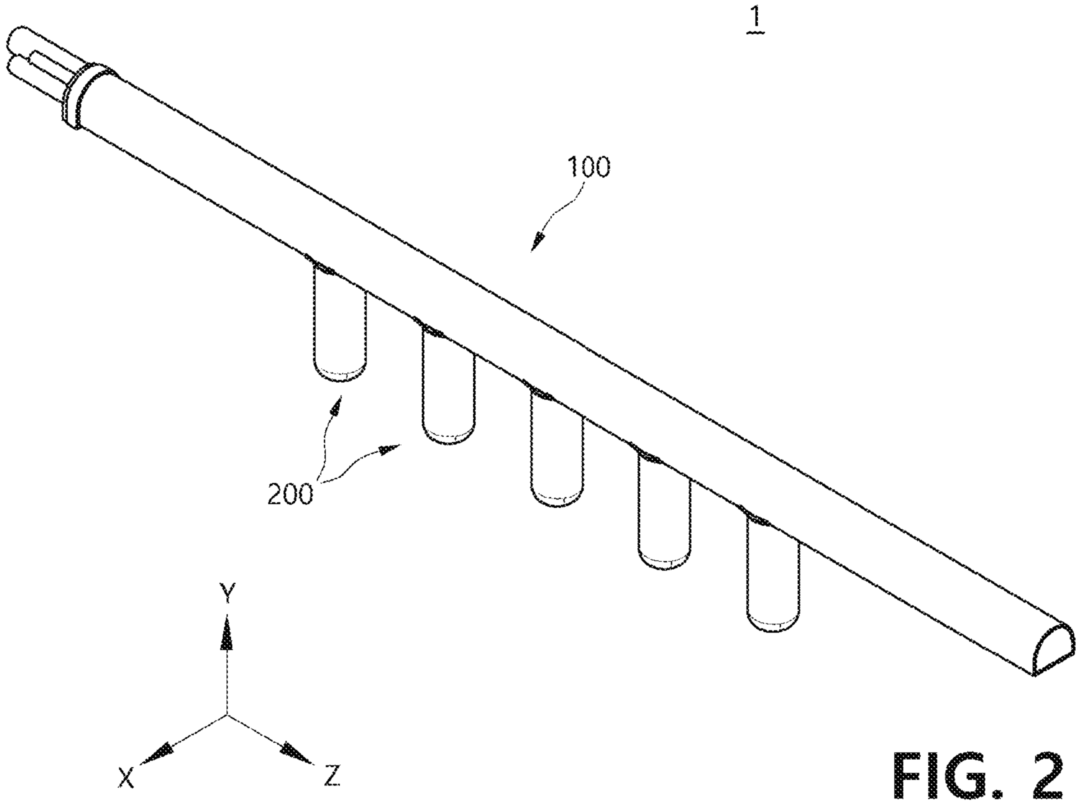
Figure 3:
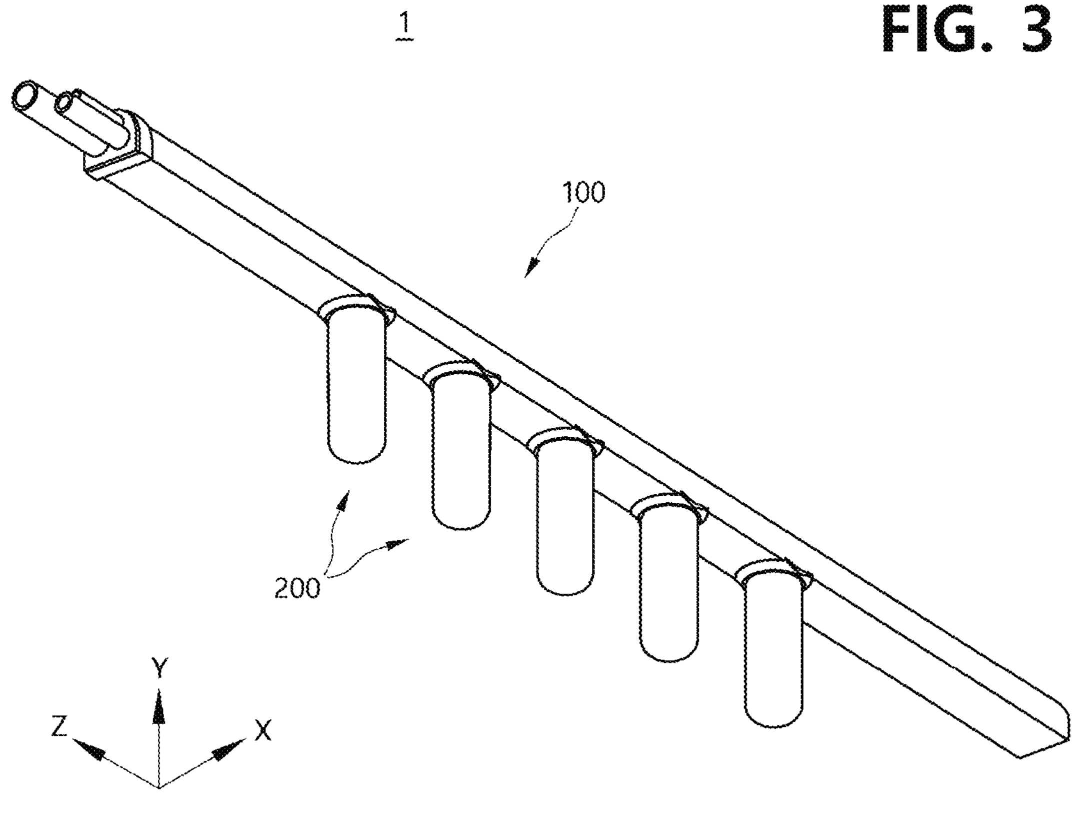
FIG. 3 is a perspective view of an ice-making evaporator according to an exemplary embodiment of the present invention, viewed from a lower side.

FIGS. 1 and 2 are perspective views of an ice-making evaporator according to an exemplary embodiment of the present invention, viewed from an upper side. FIG. 3 is a perspective view of an ice-making evaporator according to an exemplary embodiment of the present invention, viewed from a lower side.

Hereinafter, drawings will be described based on the coordinate axis shown in FIG. 1. More specifically, the positive direction of the z-axis is defined as backward, the negative direction of the z-axis is defined as forward, the positive direction of the y-axis is defined as upward direction, and the negative direction of the y-axis is defined as downward direction.

Referring to FIGS. 1 to 3, an ice-making evaporator 1 according to an exemplary embodiment of the present invention is an ice-making evaporator capable of manufacturing ice by cooling external water with a cold refrigerant circulating inside, and may include an evaporator main body 100 and a plurality of ice-making members 200.

An internal space through which a refrigerant may flow is provided inside the evaporator main body 100, and a plurality of ice-making members 200 are provided on one side of the evaporator main body 100. The plurality of ice-making members 200 are components for forming ice, and at least a part thereof may be immersed in water.

The internal spaces of the evaporator main body 100 and the ice-making members 200 are divided into a plurality of spaces by a separation member 300 (see FIG. 4) to be described later. The cold refrigerant introduced into the evaporator main body 100 is discharged to the outside of the evaporator main body 100 after sequentially flowing in the partitioned internal space.

While the refrigerant sequentially flows through the partitioned inner space, the plurality of ice-making members 200 are cooled, and ice is formed in the immersed portion of the ice-making member 200.

Hereinafter, a configuration of an ice-making evaporator according to an exemplary embodiment of the present invention will be described with different drawings.

Figure 4:
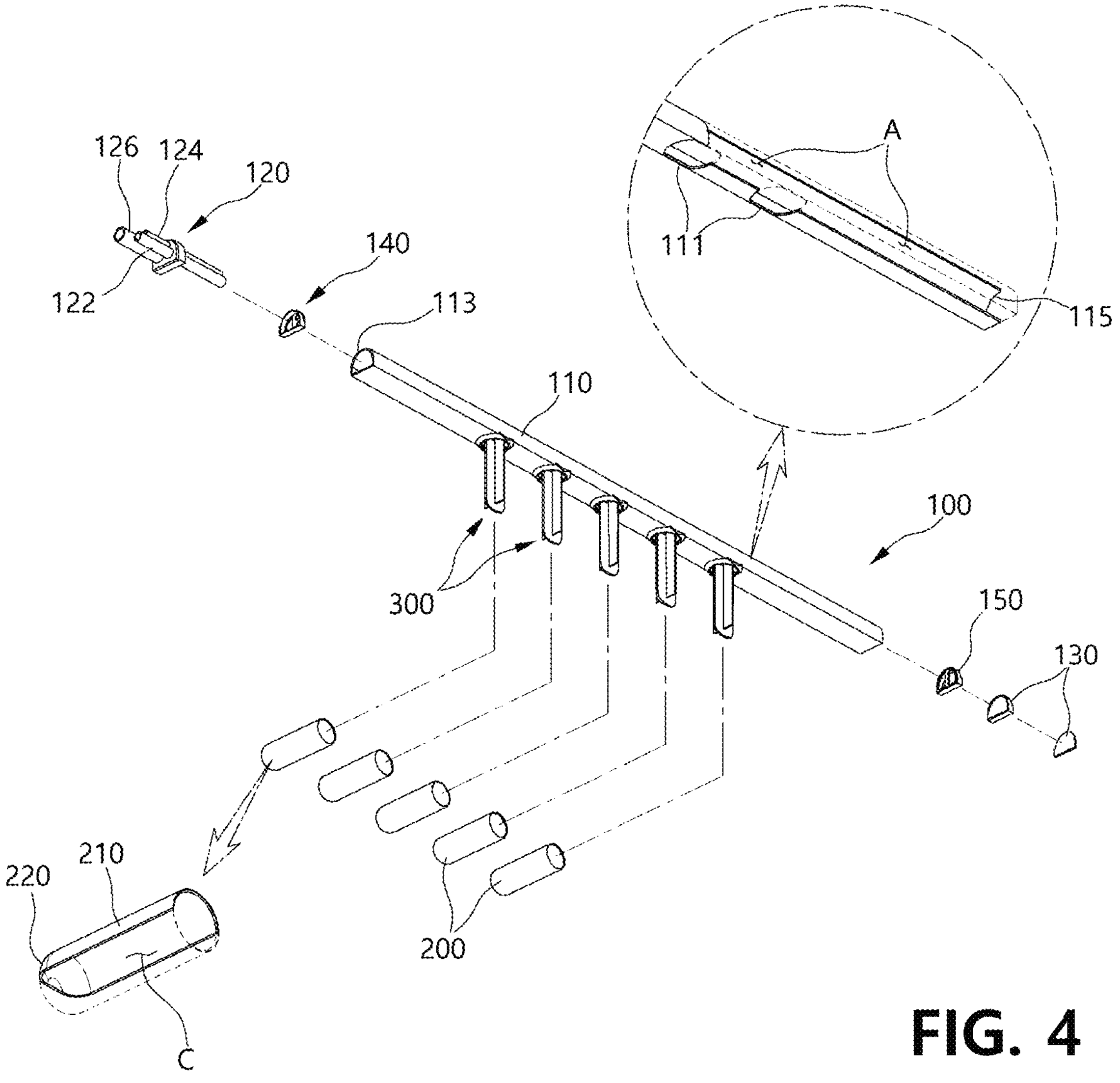
FIG. 4 is an exploded perspective view of an ice-making evaporator according to an exemplary embodiment of the present invention. In this case, in a partial enlarged view, one side of a body part of an evaporator main body and an ice-making member is shown in a dotted line so that the inside can be seen, and the components seen through are shown in a solid line.
Figure 5:
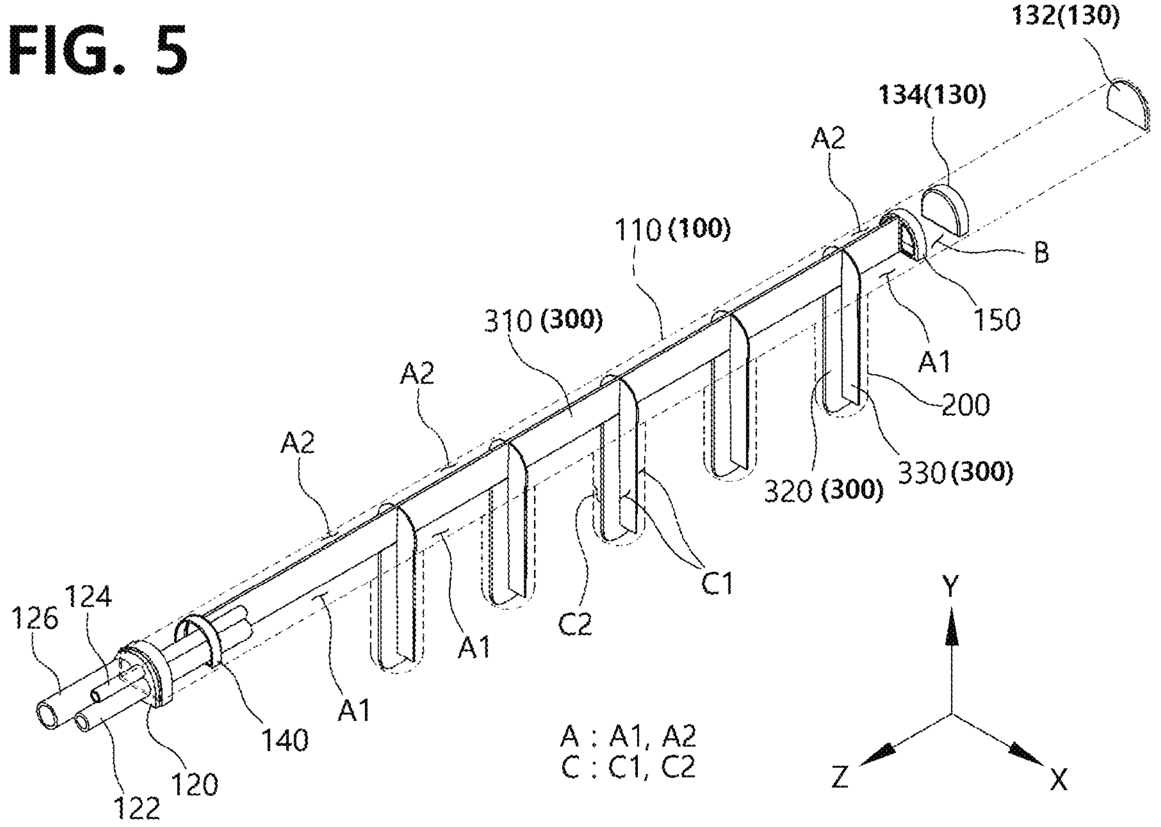
FIG. 5 is a perspective view of an ice-making evaporator according to an exemplary embodiment of the present invention, viewed from an upper side. In this case, a body part of an evaporator main body and an ice-making member are shown in a dotted line and the components seen through are shown in a solid line.
Figure 6:
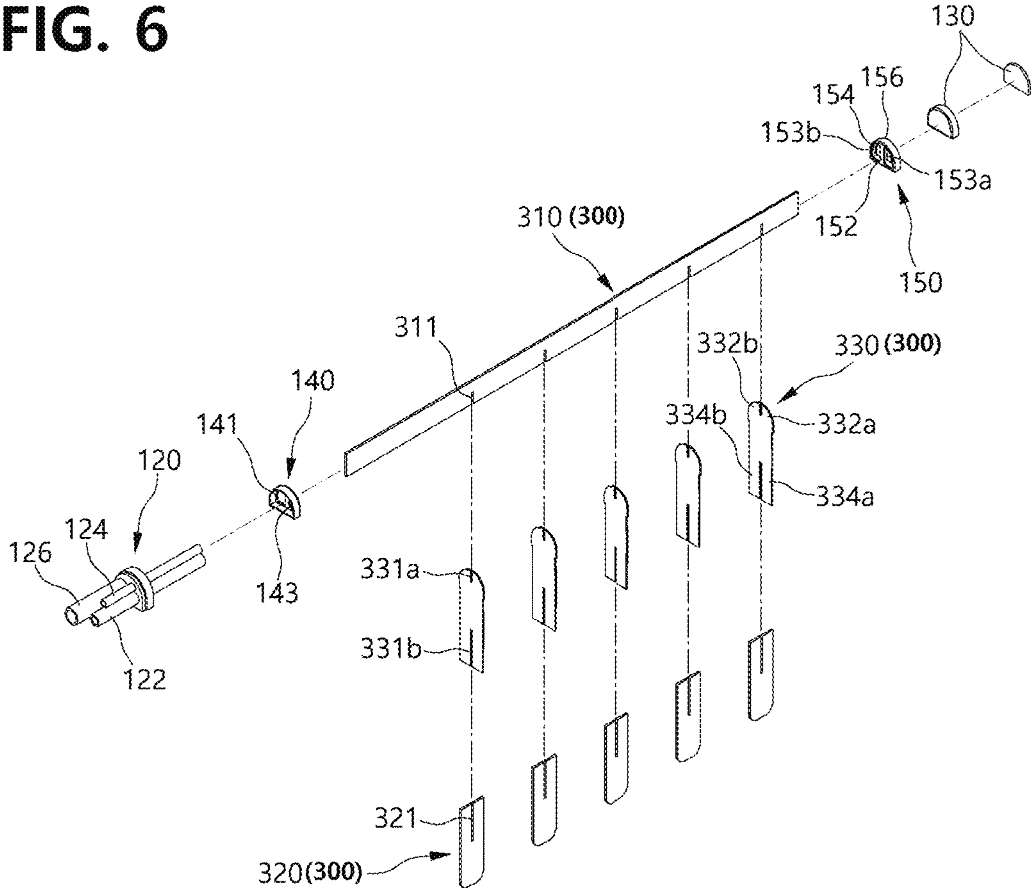
FIG. 6 is an exploded perspective view of the components illustrated by a solid line in FIG. 5.
Figure 7:
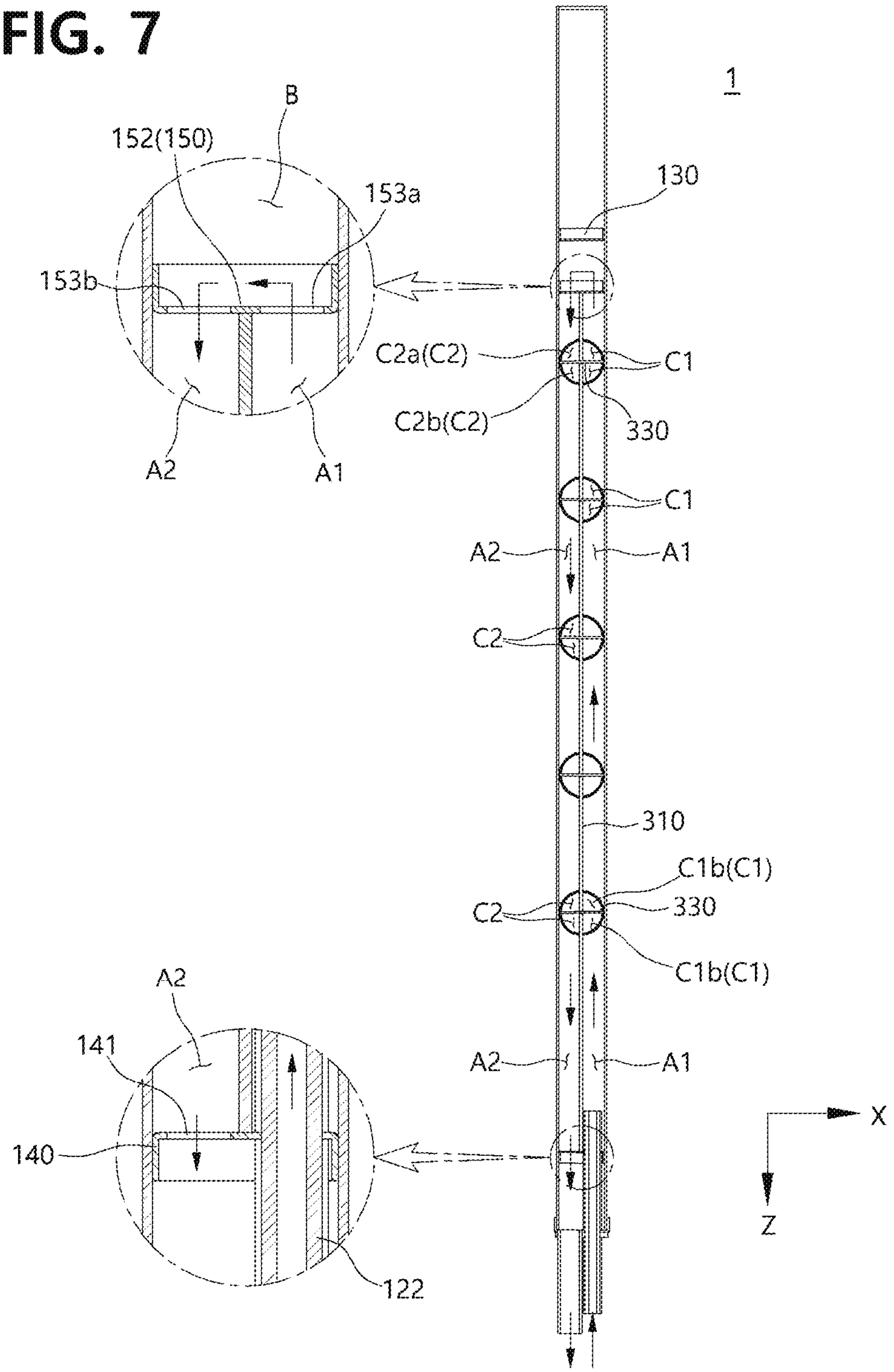
FIG. 7 is a transverse sectional view of an ice-making evaporator according to an exemplary embodiment of the present invention. In this case, in a partial enlarged view, a cross section of a part where a separation cap is located and a cross section of a part where a partition member is located are shown.
Figure 8:
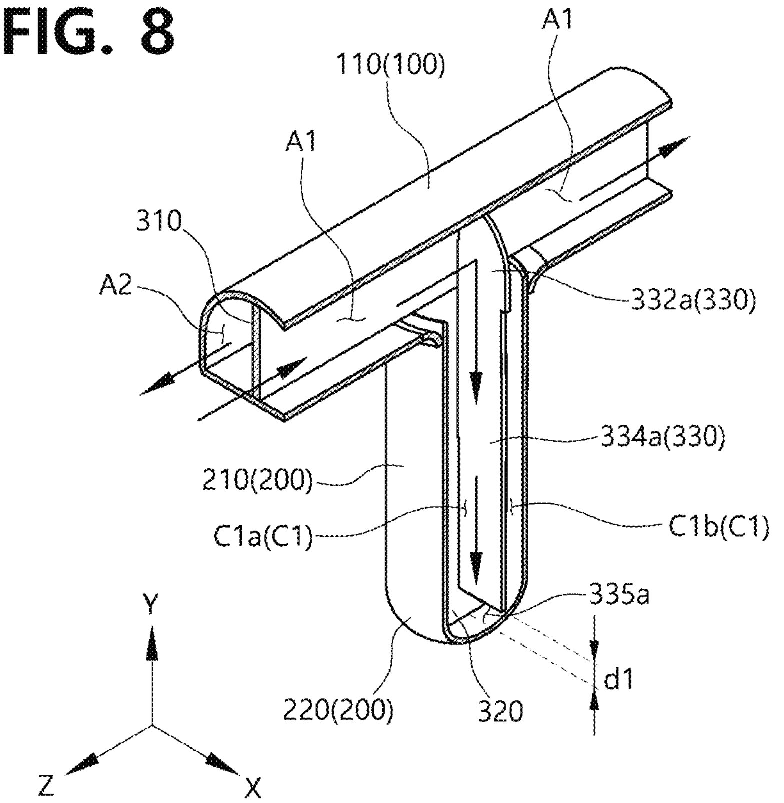
FIGS. 8 and 9 are perspective views taken along a portion of an ice-making evaporator according to an exemplary embodiment of the present invention so that a first main body space and a first heat exchange space are visible.
Figure 9:
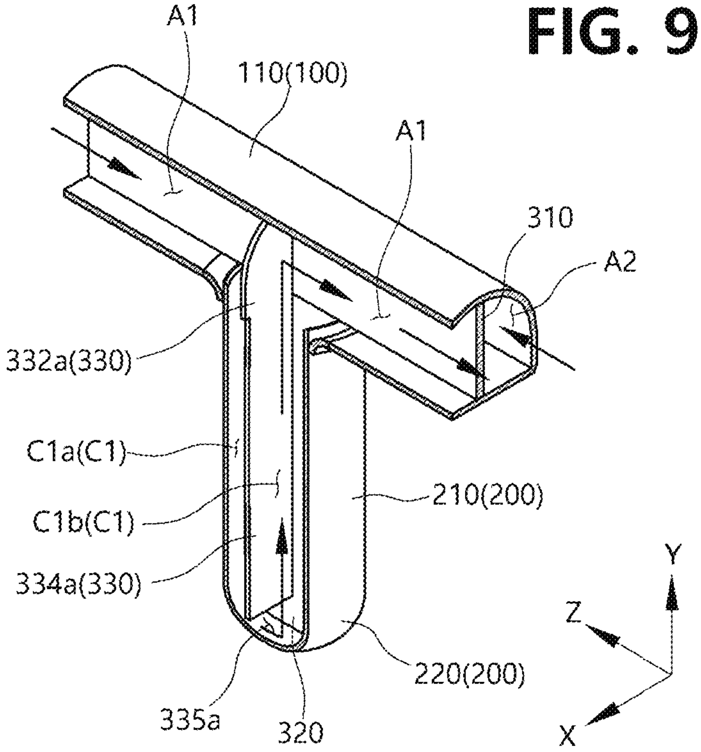
Figure 10:
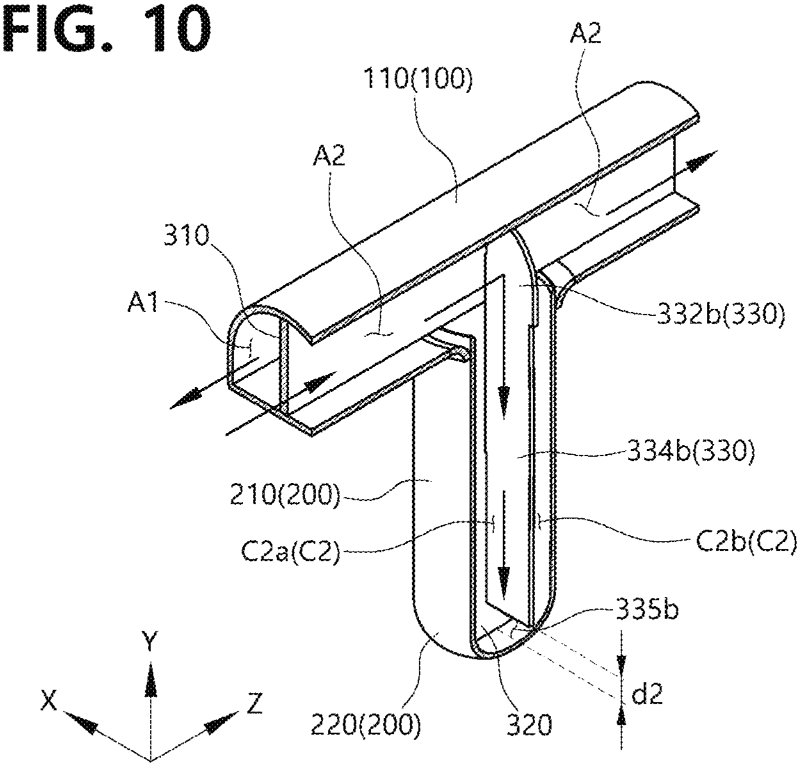
FIGS. 10 and 11 are perspective views taken along a portion of an ice-making evaporator according to an exemplary embodiment of the present invention so that a second main body space and a second heat exchange space are visible.
Figure 11:
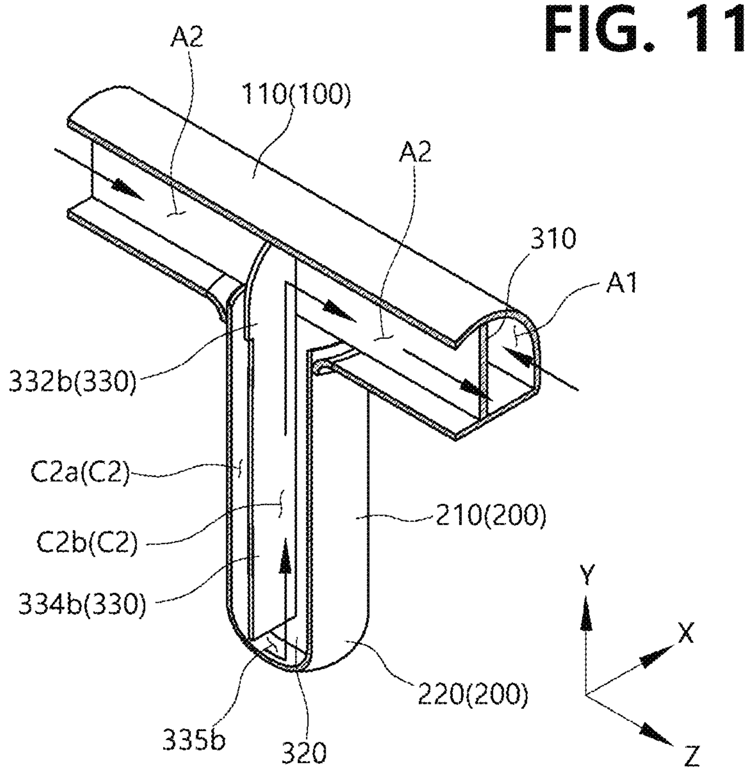

FIG. 4 is an exploded perspective view of an ice-making evaporator according to an exemplary embodiment of the present invention. In this case, in a partial enlarged view, one side of a body part of an evaporator main body and an ice-making member is shown in a dotted line so that the inside can be seen, and the components seen through are shown in a solid line. FIG. 5 is a perspective view of an ice-making evaporator according to an exemplary embodiment of the present invention, viewed from an upper side. In this case, a body part of an evaporator main body and an ice-making member are shown in a dotted line and the components seen through are shown in a solid line. FIG. 6 is an exploded perspective view of the components illustrated by a solid line in FIG. 5. FIG. 7 is a transverse sectional view of an ice-making evaporator according to an exemplary embodiment of the present invention. In this case, in a partial enlarged view, a cross section of a part where a separation cap is located and a cross section of a part where a partition member is located are shown. FIGS. 8 and 9 are perspective views taken along a portion of an ice-making evaporator according to an exemplary embodiment of the present invention so that a first main body space and a first heat exchange space are visible. FIGS. 10 and 11 are perspective views taken along a portion of an ice-making evaporator according to an exemplary embodiment of the present invention so that a second main body space and a second heat exchange space are visible.

Referring to FIGS. 4 to 5, the ice-making evaporator according to an exemplary embodiment of the present invention includes an evaporator main body 100 as described above. The evaporator main body 100 may be formed of a main body part 110 extending in one direction.

In the present embodiment, the main body part 110 extends along the front and rear sides as shown in FIG. 4, but is not limited thereto, and at least a portion thereof may be formed to be curved so as to be suitable for an inner space of a water purifier or ice maker in which the present ice-making evaporator is disposed.

A first opening 113 and a second opening 115 may be formed at both ends of the main body part 110, respectively, and a main body space A connecting the first opening 113 and the second opening 115 may be formed inside the main body part 110. In other words, in the present embodiment, the main body part 110 may have a hollow tube shape.

The main body space A is a space through which a refrigerant may flow, and may be formed along the extension direction of the main body part 110. In this case, the main body part 110 may be made of a material having a low heat transfer rate in order to minimize the transfer of external heat to the refrigerant flowing in the main body space A.

First and second closing caps 120 and 130 may be coupled to both ends of the main body space A, that is, the first and second openings 113 and 115, respectively. The first and second closing caps 120 and 130 are components for fluidly isolating the main body space A from the outside by blocking the openings 113 and 115 of the main body part 110.

In this case, in the present disclosure, the fluid isolation of two spaces means that the two spaces are separated so that they are not directly fluidly communicable with each other. Of course, two spaces isolated from each other may fluidly communicate by another space connecting them.

The closing caps 120 and 130 may be made of a material having a predetermined flexibility such as rubber and fitted and coupled into the openings 113 and 115 of the main body part 110, or may be made of a material such as metal and coupled to the main body part 110 through a welding process.

The first closing cap 120 may include a refrigerant inlet pipe 122, a heat gas inlet pipe 124, and a discharge pipe 126.

The refrigerant inlet pipe 122 is a member that forms a flow path through which a refrigerant flows into the main body space A of the main body part 110. The heat gas inlet pipe 124 is a member that forms a flow path through which a heated heat gas flows into the main body space A of the main body part 110. In addition, the discharge pipe 126 is a member that forms a flow path through which a refrigerant or heat gas flowing in the main body space A flows out.

Meanwhile, the heat gas inlet pipe 124 may not be separately provided. For example, if a heater capable of increasing the temperature of the ice-making member 200 is separately provided so that the manufactured ice is smoothly de-icing from the ice-making member 200, the heat gas inlet pipe 124 may not be provided separately.

In the present embodiment, one end of each of the refrigerant inlet pipe 122 and the heat gas inlet pipe 124 is located in a first main body space A1 to be described later, and one end of the discharge pipe 126 is located in a second main body space A2 to be described later. This will be described later together with the first and second main body spaces A1 and A2.

Referring to FIG. 5, in the illustrated embodiment, the second closing cap 130 may be provided in the plural number, for example, consisting of an outer second closing cap 132 and an inner second closing cap 134, as in the illustrated embodiment. As described above, the outer second closing cap 132 may be coupled to the second opening 115 of the main body part 110, and the inner second closing cap 134 may be coupled to be spaced apart from the second opening 115 to the inside of the main body part 110 by a predetermined distance.

The space between the outer second closing cap 132 and the inner second closing cap 134 is fluidly isolated from the main body space A. Therefore, by adjusting the separation distance between the outer second closing cap 132 and the inner second closing cap 134, the section in which the refrigerant may flow in the inner space of the main body part 110 may be limited.

In this case, in the present embodiment, a partition member 150 may be placed at a position slightly spaced apart from the second closing cap 130 to the inside of the main body part 110, and a separation cap 140 may be placed at a position slightly spaced apart from the first closing cap 120 to the inside of the main body part 110. Detailed shapes and functions of the separation cap 140 and the partition member 150 will be described later together with the separation member 300.

Meanwhile, referring back to FIG. 4, a coupling hole 111 communicating with the main body space A is formed on the side in the extension direction of the main body part 110. As shown in FIG. 4, in the present embodiment, the coupling hole 111 is open toward the lower side of the main body part 110.

At least one coupling hole 111 may be provided. Alternatively, a plurality of coupling holes 111 may be provided corresponding to a plurality of ice-making members 200 so that ice-making members 200 to be described later may be coupled, respectively. In the present embodiment, a plurality of coupling holes 111 are made of five corresponding to a case in which a plurality of ice-making members 200 are five.

In the present embodiment, the five coupling holes 111 are arranged in a row in the extension direction of the main body part 110. In this case, the distance between the plurality of coupling holes 111 may be appropriately adjusted according to the shape of the space in which the ice-making evaporator is disposed.

Referring to FIGS. 4 and 5, as described above, ice-making members 200 may be coupled to the plurality of coupling holes 111, respectively. The ice-making member 200 is a member in which ice is formed in the ice-making evaporator of the present invention, and may be made of a material having high thermal conductivity and harmless to the human body.

The ice-making member 200 may include a cylindrical ice-making part 210 extending in a direction different from the extension direction of the main body part 110 and a bottom part 220 closing one end of the ice-making part 210. In the present embodiment, the ice-making part 210 extends perpendicularly to the main body part 110. Accordingly, a heat exchange space C extending in a direction parallel to the extension direction of the ice-making part 210 may be formed inside the ice-making member 200.

The heat exchange space C is a space through which the refrigerant flowing in the main body space A of the main body part 110 passes, and one end of the heat exchange space C is fluidly isolated from the outside by the bottom part 220, and the other end of the heat exchange space C is connected to the main body space A in fluid communication.

Meanwhile, in the present embodiment, it is illustrated that the plurality of ice-making members 200 are provided as five, but the number of ice-making members 200 is not particularly limited, and one or more may be provided.

In addition, the ice-making evaporator 1 according to the present embodiment can be applied to an immersion type ice maker in which the ice-making member 200 is immersed in water to form ice, but it is not limited thereto, and may be modified to be applied to an ice maker that forms ice in other ways within the scope of not hurting the spirit of the present invention.

For example, in another embodiment, the shape of the ice-making member 200 may be modified to be suitable for a flow type ice maker or a spray type ice maker. More specifically, in another embodiment, an ice-making groove recessed to correspond to the shape of ice is formed on the outer surface of the ice-making member 200, so that it may be configured to be suitable for a spray type ice maker that generates ice by spraying water into the ice-making groove.

Meanwhile, in the present embodiment, the ice-making member 200 and the evaporator main body 100 are configured to be provided as separate members and then combined with each other. Accordingly, the main body part 110 of the evaporator main body 100 and the ice-making member 200 may be made of different materials. However, it is not limited to this, and the main body part 110 and the ice-making member 200 may be provided as a single member by being manufactured by a forging process or a mold process or the like.

Meanwhile, referring to FIGS. 4 to 7, the ice-making evaporator 1 according to an exemplary embodiment of the present invention may further include a separation member 300 provided inside the evaporator main body 100 and the ice-making member 200.

The separation member 300 is a component that partitions the above-described main body space A and heat exchange space C and forces the refrigerant to flow while circulating through the partitioned main body space A and heat exchange space C. In this case, the separation member 300 may be made of a material having a low heat transfer rate to minimize heat exchange between refrigerants flowing in the partitioned space.

The separation member 300 may include a main body space-dividing wall 310. Alternatively, the separation member 300 may include a heat exchange space-dividing wall 320. Alternatively, the separation member 300 may include a guide wall 330.

In the present embodiment, as shown in FIGS. 5 and 7, the main body space-dividing wall 310 may be disposed in the main body space A to be formed side by side along the extension direction of the main body part 110. Accordingly, the main body space-dividing wall 310 divides the main body space A into a first main body space A1 and a second main body space A2 formed side by side with the extension direction of the main body part 110.

In this case, the first main body space A1 and the second main body space A2 may be symmetrically formed around the main body space-dividing wall 310. In addition, the main body space-dividing wall 310 may be disposed to cross the coupling hole 111 in the diameter direction.

Accordingly, the refrigerant flowing in the first main body space A1 cannot directly flow into the second main body space A2 across the main body space-dividing wall 310 and is forced to flow in the extension direction of the first main body space A1.

Likewise, the refrigerant flowing in the second main body space A2 cannot flow into the first main body space A1 across the main body space-dividing wall 310 and is forced to flow in the extension direction of the second main body space A2.

A first guide wall coupling groove 311 to which the guide wall 330 to be described later may be coupled may be formed on the side in the extension direction of the main body space-dividing wall 310. In this case, the first guide wall coupling groove 311 may be provided in the plural number, corresponding to the number of ice-making members 200, and the plurality of first guide wall coupling grooves 311 may be arranged side by side along the extension direction.

Referring to FIGS. 5 to 7, a separation cap 140 may be provided at an end of the main body space-dividing wall 310 on the side of the first closing cap 120, that is, at the rear end in the illustrated embodiment. The separation cap 140 is a component for preventing a refrigerant flowing in the first main body space A1 (or the second main body space A2) from circling the front end of the main body space-dividing wall 310 into the second main body space A2 (or the first main body space A1).

The separation cap 140 divides a predetermined space provided between the first closing cap 120 and the main body space-dividing wall 310 and the main body space A, and closes the rear end side of the first main body space A1. Accordingly, the rear end side of the first main body space A1 and the rear end side of the second main body space A2 may be fluidly isolated from each other by the separation cap 140.

An inlet pipe through hole 143 is formed in a portion, facing the first main body space A1, of the separation cap 140. The refrigerant inlet pipe 122 and heat gas inlet pipe 124 described above are coupled through the inlet pipe through hole 143. A discharge hole 141, which communicates with the rear end side of the second main body space A2, is formed in a portion, facing the second main body space A2, of the separation cap 140.

In the present embodiment, ends of the refrigerant inlet pipe 122 and the heat gas inlet pipe 124 are located at the front side of the separation cap 140, and ends of the discharge pipe 126 are located at the rear side of the separation cap 140.

Accordingly, the refrigerant or heat gas from the refrigerant inlet pipe 122 or the heat gas inlet pipe 124 is blocked by the separation cap 140 and cannot flow backward, and is forced to flow forward along the first main body space A1. In addition, the refrigerant or heat gas introduced into the discharge hole 141 from the second main body space A2 is blocked by the separation cap 140 and cannot flow into the first main body space A1, and is forced to flow into the discharge pipe 126.

Meanwhile, referring to FIGS. 4 to 7, a circling space B may be provided on one side of the main body space A inside the main body part 110, that is, on the front end side of the main body space A in the illustrated embodiment, and a partition member 150 may be positioned between the main body space A and the circling space B.

The partition member 150 is a component for checking whether the internal spaces of the evaporator main body 100 and the ice-making member 200 are divided so as to be fluidly isolated from each other by the separation member 300. The partition member 150 may be coupled to the inner wall of the main body part 110 by a welding process or the like. The specific function of the partition member 150 will be described later with reference to FIG. 12.

The partition member 150 may include a body part 152 that partitions the main body space A and the circling space B. In the body part 152, a first hole 153*a* for fluidly connecting the first main body space A1 and the circling space B, and a second hole 153*b* for fluidly connecting the second main body space A2 and the circling space B are formed.

Accordingly, the refrigerant flowing in the first main body space A1 may flow into the circling space B through the first hole 153*a* and then into the second main body space A2 through the second hole 153*b*.

An extension 154 may be provided around the body part 152 of the partition member 150. The extension 154 extends from the circumference of the body part 152 toward the circling space B, and is formed such that the outer surface thereof is in contact with the inner wall of the main body part 110.

Accordingly, since the extension 154 may be somewhat elastically deformed when pressed inward by the inner wall of the main body part 110, the partition member 150 may be easily inserted into the main body part 110.

In addition, when the partition member 150 is coupled to the main body part 110 by a welding process or the like, the molten welding metal can easily permeate between the outer surface of the extension 154 and the inner wall of the main body part 110 due to a capillary phenomenon, so that the partition member 150 and the main body part 110 can be strongly coupled to each other.

Meanwhile, the partition member 150 does not necessarily include the extension 154 described above. For example, if the coupling force between the body part 152 and the main body part 110 can be sufficiently secured, the partition member 150 may be formed of only a plate-shaped body part 152.

A component similar to that of the extension 154 of the partition member 150 described above may be configured in the same manner in other components inserted into the main body part 110. For example, components similar to the extension 154 of the partition member 150 may be provided around the separation cap 140 and the inner second closing cap 134.

However, even in this case, as mentioned concerning the extension 154 of the partition member 150, the separation cap 140 and the inner second closing cap 134 do not necessarily include components corresponding to the extension 154 of the partition member 150.

Meanwhile, referring to FIGS. 5 to 7, the heat exchange space-dividing wall 320 may be disposed in contact with the side of the main body space-dividing wall 310 in the extension direction. The heat exchange space-dividing wall 320 may be disposed side by side with the main body space-dividing wall 310 on a plane on which the main body space-dividing wall 310 is disposed, that is, on a plane extending in the front-rear direction and the up-down direction in the illustrated embodiment.

The heat exchange space-dividing wall 320 is a component for partitioning the heat exchange space C of the ice-making member 200, and may be provided in plurality corresponding to the number of ice-making members 200. The heat exchange space-dividing wall 320 is disposed in the heat exchange space C, and may extend in the same direction as the extension direction of the ice-making member 200.

Accordingly, the heat exchange space C may be divided into a first heat exchange space C1 and a second heat exchange space C2 that are fluidly isolated from each other. In this case, the first heat exchange space C1 is fluidly connected to the first main body space A1, and the second heat exchange space C2 is fluidly connected to the second main body space A2.

A second guide wall coupling groove 321 to which the guide wall 330 to be described later may be coupled may be formed at an end of the heat exchange space-dividing wall 320 toward the main body space A. In this case, the first guide wall coupling groove 311 and the second guide wall coupling groove 321 may be positioned to face each other. Accordingly, the guide wall 330 having a flat plate shape to be described later may be simultaneously coupled to the first guide wall coupling groove 311 and the second guide wall coupling groove 321.

Referring to FIGS. 6 to 10, the guide wall 330 may be coupled to the main body space-dividing wall 310 and the heat exchange space-dividing wall 320. In this case, the guide wall 330 may be disposed perpendicular to the main body space-dividing wall 310 and the heat exchange space-dividing wall 320.

The guide wall 330 may include main body space-side guide parts 332*a* and 332*b*. The main body space-side guide parts 332*a* and 332*b* are components for guiding the refrigerant flowing in the main body spaces A1 and A2 to the heat exchange spaces C1 and C2.

The main body space-side guide parts 332*a* and 332*b* may include a first main body space-side guide part 332*a* and a second main body space-side guide part 332*b*. The first main body space-side guide part 332*a* may be configured to be disposed in the first main body space A1 to guide the refrigerant flowing through the first main body space A1 to the first heat exchange space C1. The second main body space-side guide part 332*b* may be configured to be disposed in the second main body space A2 to guide the refrigerant flowing in the second main body space A2 to the second heat exchange space C2.

Meanwhile, a first dividing wall coupling groove 331*a* correspondingly coupled to the first guide wall coupling groove 311 of the main body space-dividing wall 310 described above is formed on the upper side of the main body space-side guide part 332*a*, 332*b*.

In addition, heat exchange space-side guide parts 334*a* and 334*b* may be provided on one side of the main body space-side guide parts 332*a* and 332*b*, that is, on the lower side in the illustrated embodiment. The heat exchange space-side guide parts 334*a* and 334*b* are components for guiding the flow of refrigerant flowing in the heat exchange space C.

Referring to FIGS. 6, 8, and 9, the heat exchange space-side guide parts 334*a* and 334*b* may include a first heat exchange space-side guide part 334*a* disposed in the first heat exchange space C1 to divide the first heat exchange space C1 into a first passing space C1*a* and a second passing space C1*b*.

The first heat exchange space-side guide part 334*a* may extend from the first main body space-side guide part 332*a* along the extension direction of the ice-making member 200, that is, the downward direction in the illustrated embodiment. Accordingly, the first heat exchange space-side guide part 334*a* may induce the refrigerant to flow in the up-down direction.

In this case, the first heat exchange space-side guide part 334*a* may be formed to be slightly shorter than the length of the first heat exchange space C1. In other words, an end of the first heat exchange space-side guide part 334*a* may be disposed to be slightly spaced apart from the bottom part 220 of the ice-making member 200 in the upward direction. Accordingly, a first flow hole 335*a* may be formed between the end of the first heat exchange space-side guide part 334*a* and the bottom part 220.

The first flow hole 335*a* like this connects the lower end of the first passing space C1*a* and the lower end of the second passing space C1*b* to fluidly communicate with each other. Therefore, the refrigerant flowing in the first passing space C1*a* can flow into the second passing space C1*b* only when it reaches the end of the ice-making member 200, so the ice-making member 200 can be entirely cooled in the up-down direction by the refrigerant flowing in the first passing space C1*a*.

Meanwhile, in the present embodiment, the first flow hole 335*a* is formed between the end of the first heat exchange space-side guide part 334*a* and the bottom part 220 of the ice-making member 200, but the first flow hole 335*a* may be formed through the end of the first heat exchange space-side guide part 334*a*.

Referring to FIGS. 6, 10, and 11, the second heat exchange space-side guide part 334*b* may be provided on one side of the first heat exchange space-side guide part 334*a*. In this case, since the second heat exchange space-side guide part 334*b* may be formed symmetrically with the first heat exchange space-side guide part 334*a* around the heat exchange space-dividing wall 320, the detailed structure of the second heat exchange space-side guide part 334*b* will be replaced by the description of the first heat exchange space-side guide part 334*a* described above.

Meanwhile, referring to FIG. 6, a second dividing wall coupling groove 331*b* may be formed in the heat exchange space-side guide parts 334*a* and 334*b*. The second dividing wall coupling groove 331*b* may be open downward. Accordingly, the second dividing wall coupling groove 331*b* may be correspondingly coupled to the second guide wall coupling groove 321 of the heat exchange space-dividing wall 320 described above.

Due to this, the main body space-dividing wall 310, the guide wall 330, and the heat exchange space-dividing wall 320 may be sequentially combined (or assembled) as follows.

The first guide wall coupling groove 311 of the main body space-dividing wall 310 and the first dividing wall coupling groove 331*a* of the guide wall 330 are correspondingly coupled to each other, so that the main body space-dividing wall 310 and the guide wall 330 may be coupled to each other (hereinafter, the first process). In addition, the second dividing wall coupling groove 331*b* of the guide wall 330 and the second guide wall coupling groove 321 of the heat exchange space-dividing wall 320 are correspondingly coupled to each other, so that the guide wall 330 and the heat exchange space-dividing wall 320 may be combined (or assembled) with each other (hereinafter, the second process). In this case, the order of the first process and the second process is not particularly limited.

As such, in the present embodiment, the main body space-dividing wall 310 and the heat exchange space-dividing wall 320 can be formed as separate members and then combined (or assembled), so that the shape of the components constituting the separation member 300 can be simplified, reducing manufacturing costs.

In addition, according to the present embodiment, since the guide wall 330 and the heat exchange space-dividing wall 320 can be sequentially coupled to the main body space-dividing wall 310 placed inside the main body part 110 through the coupling hole 111 (see FIG. 4) of the main body part 110, the manufacturing convenience and assimilability of the ice-making evaporator 1 can be improved.

Hereinafter, a process in which the refrigerant flows in the ice-making evaporator according to the present embodiment will be described.

Referring to FIGS. 5 and 7, in the ice-making evaporator 1 according to an exemplary embodiment of the present invention, cold refrigerant may flow into the first main body space A1 from the refrigerant inlet pipe 122. The introduced refrigerant flows forward in the extension direction of the first main body space A1.

Referring to FIGS. 8 and 9, the refrigerant flowing in the first main body space A1 flows out into the first passing space C1*a* of the first heat exchange space C1 by the first main body space-side guide part 332*a*.

The refrigerant introduced into the first passing space C1*a* is guided to the lower end of the first passing space C1*a* by the first heat exchange space-side guide part 334*a*, and cools entirely the right rear part of the ice-making member 200.

The refrigerant reaching the lower end of the first passing space C1*a* passes through the first flow hole 335*a* and flows out to the lower end of the second passing space C1*b*. The refrigerant introduced into the lower end of the second passing space C1*b* is guided to the upper end of the second passing space C1*b* by the first heat exchange space-side guide part 334*a*, and cools entirely the right front part of the ice-making member 200.

In accordance with the above-described process, the refrigerant sequentially passes through the plurality of first heat exchange spaces C1 while flowing from the front end to the rear end of the first main body space A1. Due to this, the right parts of the plurality of ice-making members 200 may be entirely cooled by the refrigerant.

Referring to FIG. 7, the refrigerant reaching the rear end of the first main body space A1 passes through the first hole 153*a* and flows out into the circling space B. The refrigerant introduced into the circling space B passes through the second hole 153*b* and flows out to the rear end of the second main body space A2.

Referring to FIGS. 10 and 11, the refrigerant introduced into the second main body space A2 flows out into the first passing space C2*a* of the second heat exchange space C2 by the second main body space-side guide part 332*b*.

The refrigerant introduced into the first passing space C2*a* is guided to the lower end of the first passing space C2*a* by the second heat exchange space-side guide part 334*b*, and cools entirely the left rear part of the ice-making member 200.

The refrigerant reaching the lower end of the first passing space C2*a* passes through the second flow hole 335*b* and flows out to the lower end of the second passing space C2*b*. The refrigerant introduced into the lower end of the second passing space C2*b* is guided to the upper end of the second passing space C2*b* by the second heat exchange space-side guide part 334*b*, and cools entirely the left rear part of the ice-making member 200.

In accordance with the above-described process, the refrigerant sequentially passes through the plurality of second heat exchange spaces C2 while flowing from the rear end to the front end of the second main body space A2. Due to this, the left parts of the plurality of ice-making members 200 may be entirely cooled by the refrigerant.

As described above, in the present embodiment, the refrigerant may circulate through the partitioned spaces A1, A2, C1, and C2 inside the evaporator main body 100 and the ice-making member 200 to cool the ice making member 200.

Therefore, according to the present embodiment, the contact time between the refrigerant and the ice-making member 200 may be prolonged, the cooling capacity of the refrigerant may be maximized, and ice may be efficiently manufactured.

In addition, according to the present embodiment, the cooling capacity of the refrigerant can be evenly distributed to the plurality of ice-making members 200, so that the plurality of ice-making members 200 can be cooled uniformly and ice with a uniform size can be formed for each of the plurality of ice-making members 200.

Hereinafter, the function of the partition member according to an exemplary embodiment of the present invention will be described with different drawings.

Figure 12:
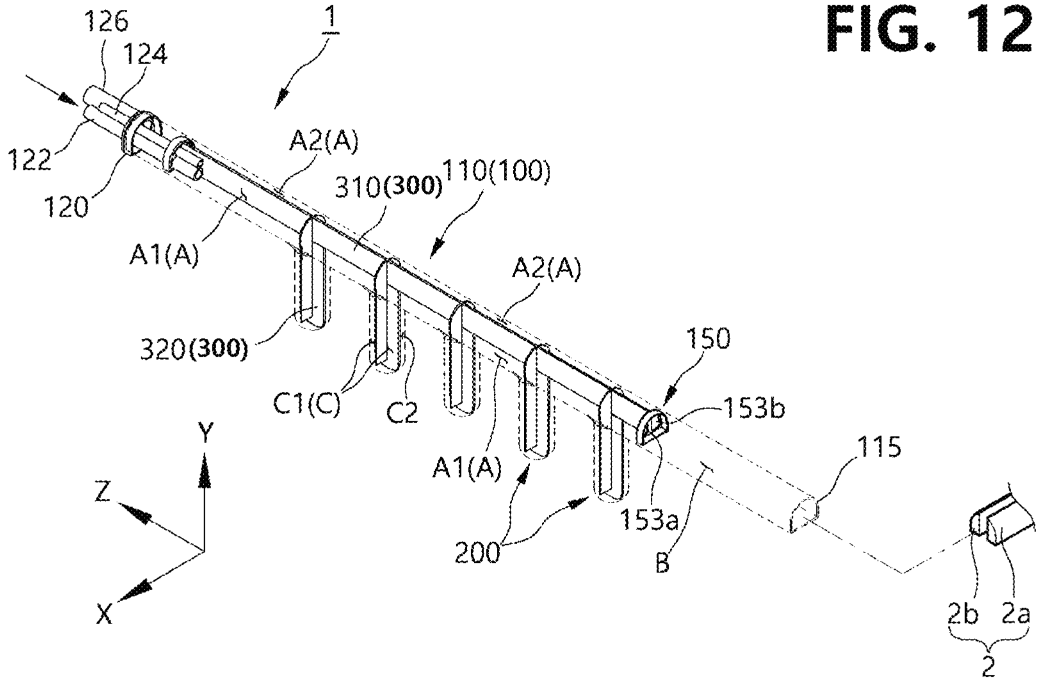
FIG. 12 is a view for describing a process of checking whether inner spaces of an evaporator main body and an ice-making member, the inner spaces partitioned using a partition member of an ice-making evaporator according to an exemplary embodiment of the present invention, are fluidly isolated.

FIG. 12 is a view for describing a process of checking whether inner spaces of an evaporator main body and an ice-making member, the inner spaces partitioned using a partition member of an ice-making evaporator according to an exemplary embodiment of the present invention, are fluidly isolated.

Referring to FIG. 12, in the ice-making evaporator 1 according to an exemplary embodiment of the present invention, the second closing cap 130 (see FIG. 4) is not installed in the second opening 115 of the main body part 110, and thus one side of the circling space B may be open to the outside. Hereinafter, the above-described state is defined as an inspection preparation state.

In the inspection preparation state, an inspection member 2 may be inserted into the main body part 110 through the open second opening 115. The inspection member 2 is a member for inspecting whether the partitioned inner spaces of the ice-making evaporator 1 are fluidly isolated from each other, and may be provided separately from the ice-making evaporator 1.

The inspection member 2 may include a first inspection cap 2*a* corresponding to the shape of the first hole 153*a* and a second inspection cap 2*b* corresponding to the shape of the second hole 153*b*. The first inspection cap 2*a* may be inserted into the first hole 153*a* to close the first hole 153*a*, and the second inspection cap 2*b* may be inserted into the second hole 153*b* to close the second hole 153*b*.

Hereinafter, a state in which the first and second holes 153*a* and 153*b* are closed by the inspection member 2 is defined as an inspection preparation complete state. In addition, a space formed by connecting the first main body space A1 and the first heat exchange space C1 is defined as a first inspection target space A1, C1, and a space formed by connecting the second main body space A2 and the second heat exchange space C2 is defined as a second inspection target space A2, C2.

In the inspection preparation complete state, by the inspection member 2, the first main body space A1 and the circling space B are fluidly isolated from each other, and the second main body space A2 and the circling space B are fluidly isolated from each other. Therefore, if there is no defect in the separation member 300, the first inspection target spaces A1 and C1 and the second inspection target spaces A2 and C2 are fluidly isolated from each other.

In this case, the characteristics of the inspection target spaces A1, C1, A2, and C2 may be checked to confirm whether the first inspection target spaces A1 and C1 and the second inspection target spaces A2 and C2 are completely fluidly isolated by the separation member 300.

In the present embodiment, in order to confirm the characteristics of the inspection target spaces A1, C1, A2, and C2, a predetermined fluid is injected into the first inspection target spaces A1 and C1 through the refrigerant inlet pipe 122 or the heat gas inlet pipe 124, and the physical state of the injected fluid is checked. In this case, the predetermined fluid may be air compressed at a high pressure.

In the present embodiment, in order to check the physical state of the injected fluid, it is checked whether the injected fluid leaks from the first inspection target spaces A1 and C1 to the second inspection target spaces A2 and C2. In this case, whether it is leaked may be confirmed by checking whether the fluid is discharged through the discharge pipe 126.

If there is no fluid flowing out through the discharge pipe 126, it may be determined that the first inspection target spaces A1 and C1 and the second inspection target spaces A2 and C2 are completely fluidly isolated by the separation member 300, and if there is a fluid flowing out through the discharge pipe 126, it may be determined that the separation member 300 is defective.

In the ice-making evaporator 1, which has a defect in the separation member 300, the refrigerant introduced into the inside may directly leak into the space connected to the discharge pipe 126 and be discharged to the outside. Therefore, such an ice-making evaporator 1 cannot fully exhibit the cooling capacity of the refrigerant, and if the degree is severe, ice cannot be manufactured.

As such, it is preferable that the ice-making evaporator 1, which is determined to have a defect in the separation member 300, is discarded or repaired and then inspected for isolation again according to the above-described process.

As such, according to the ice-making evaporator 1 according to the present embodiment, by using the partition member 150, it is possible to prevent the manufacture of an ice-making evaporator with poor ice-making performance, that is, a defective product.

Hereinafter, a method for manufacturing an ice-making evaporator according to an exemplary embodiment of the present invention will be described with different drawings.

Figure 13:
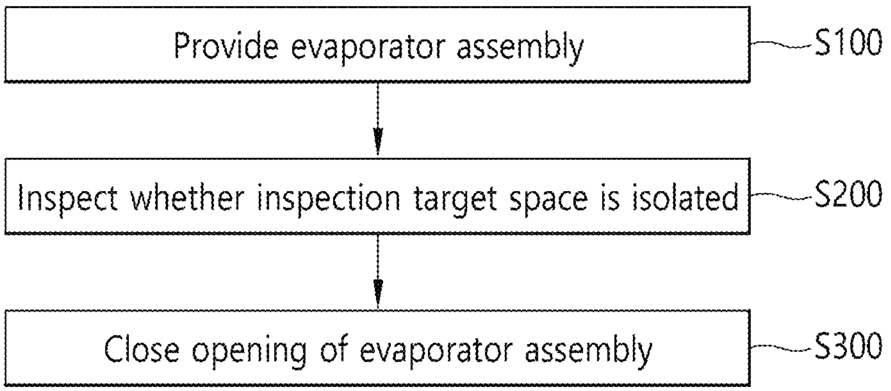
FIG. 13 is a flowchart of a method for manufacturing an ice-making evaporator according to an exemplary embodiment of the present invention.
Figure 14:
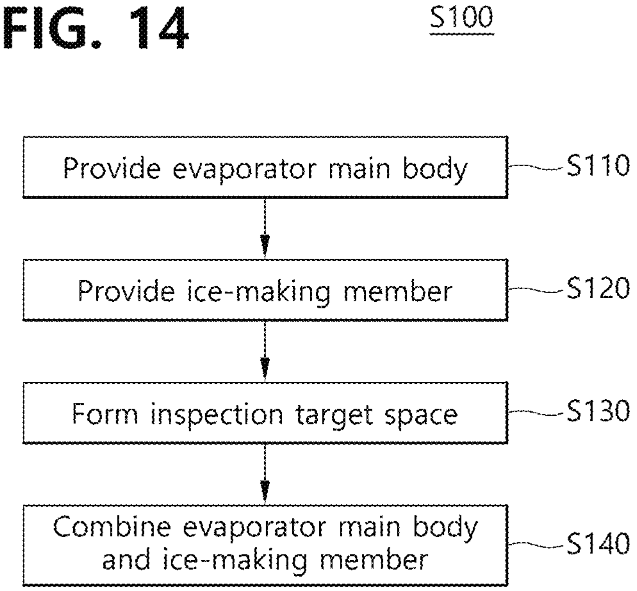
FIG. 14 is a flowchart in which a step of providing an evaporator assembly in a method for manufacturing an ice-making evaporator according to an exemplary embodiment of the present invention is subdivided.
Figure 15:
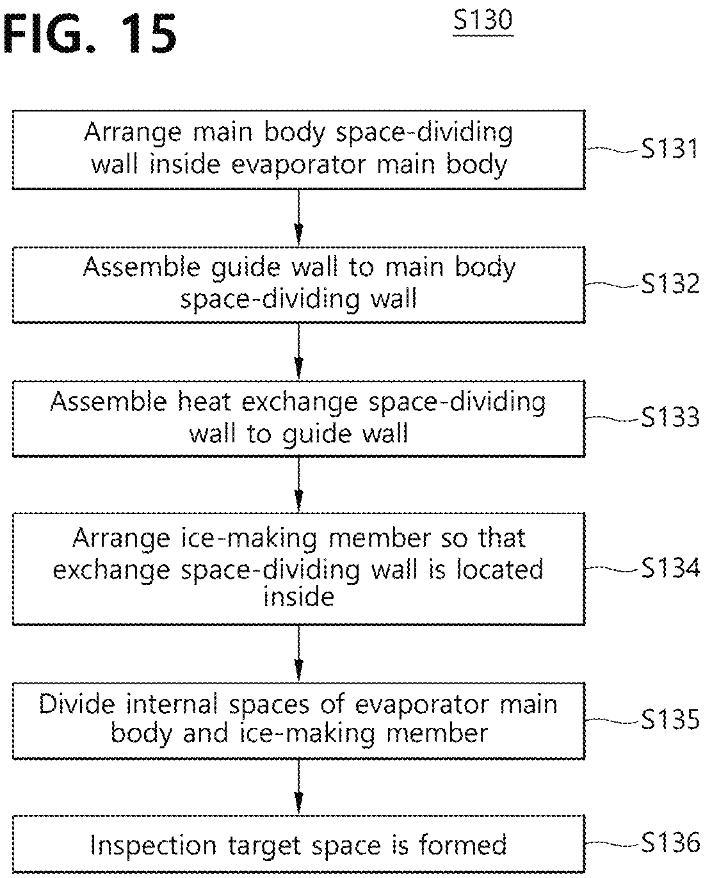
FIG. 15 is a flowchart in which a step of forming an inspection target space in a method for manufacturing an ice-making evaporator according to an exemplary embodiment of the present invention is subdivided.
Figure 16:
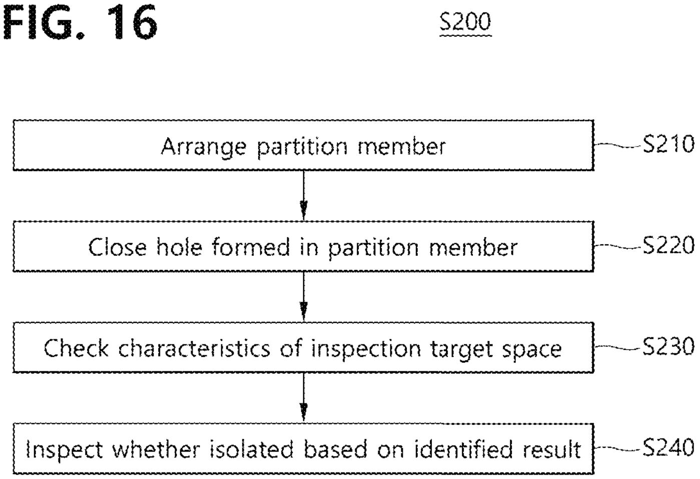
FIG. 16 is a flowchart in which a step of inspecting whether an inspection target space is isolated in a method for manufacturing an ice-making evaporator according to an exemplary embodiment of the present invention is subdivided.
Figure 17:
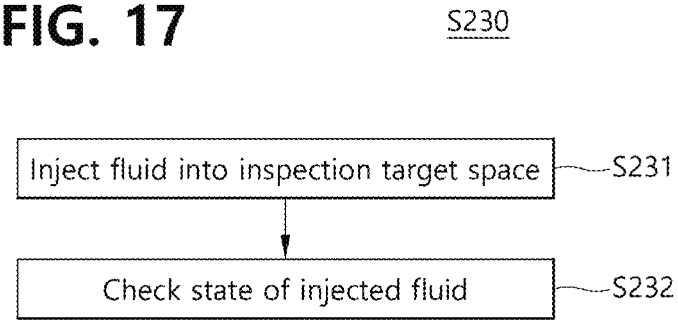
FIG. 17 is a flowchart in which a step of checking characteristics of an inspection target space in a method for manufacturing an ice-making evaporator according to an exemplary embodiment of the present invention is subdivided.

FIG. 13 is a flowchart of a method for manufacturing an ice-making evaporator according to an exemplary embodiment of the present invention. FIG. 14 is a flowchart in which a step of providing an evaporator assembly in a method for manufacturing an ice-making evaporator according to an exemplary embodiment of the present invention is subdivided. FIG. 15 is a flowchart in which a step of forming an inspection target space in a method for manufacturing an ice-making evaporator according to an exemplary embodiment of the present invention is subdivided. FIG. 16 is a flowchart in which a step of inspecting whether an inspection target space is isolated in a method for manufacturing an ice-making evaporator according to an exemplary embodiment of the present invention is subdivided. FIG. 17 is a flowchart in which a step of checking characteristics of an inspection target space in a method for manufacturing an ice-making evaporator according to an exemplary embodiment of the present invention is subdivided.

To help understand the present invention, in the present disclosure, a process of manufacturing the ice-making evaporator shown in FIGS. 1 to 12 by the method for manufacturing an ice-making evaporator according to an exemplary embodiment of the present invention will be described.

Referring to FIG. 13 together with FIGS. 4 and 5, in the method for manufacturing an ice-making evaporator according to an exemplary embodiment of the present invention, an evaporator assembly 100, 200, 300 in which the inside is divided into first inspection target spaces A1 and C1 and second inspection target spaces A2 and C2 is provided in step S100.

In this case, a circling space B is provided at one side of the first and second inspection target spaces A1, C1, A2, and C2. The circling space B is a part of the internal space of the evaporator assembly 100, 200, 300, and one side is fluidly connected to the first and second inspection target spaces A1, C1, A2, and C2 and the other side is open to the outside.

Referring to FIGS. 14 and 4, in the step S100 of providing an evaporator assembly 100, 200, 300, an evaporator main body 100 with a main body space A therein is provided in step S110, and an ice-making member 200 with a heat exchange space C therein is provided in step S120. In this case, the order of the step S110 of providing an evaporator main body 100 and the step S120 of providing an ice-making member 200 may be changed.

In the step S110 of providing an evaporator main body 100, a tubular main body part 110 in which both ends are open and the inner space A communicates through the open ends may be provided. In this case, in the step S110 of providing an evaporator main body 100, a side part in the extension direction of the main body part 110 is processed flat using a forging process, etc., and a plurality of first coupling holes 111 may be formed on the flat side part.

In the step S100 of providing an evaporator assembly 100, 200, 300, after the evaporator main body 100 and the ice-making member 200 are provided in steps S110 and S120, inspection target spaces A1, C1, A2, and C2 are formed inside the evaporator main body 100 and the ice-making member 200 in step S130.

Referring to FIGS. 15 and 4 to 6 together, in the step S130 of forming inspection target spaces A1, C1, A2, and C2, a main body space-dividing wall 310 may be disposed inside the main body part 110 of the evaporator main body 100 in step S131. The main body space A inside the main body part 110 is divided into a first main body space A1 and a second main body space A2 by the main body space-dividing wall 310.

In the present embodiment, since the main body space-dividing wall 310 and the heat exchange space-dividing wall 320 are provided as separate members, and the width in the up-down direction of the main body space-dividing wall 310 is smaller than or equal to the diameter of openings 113 and 115 of the main body part 110, the main body space-dividing wall 310 may be placed inside the main body part 110 by being inserted through the openings 113 and 115.

As such, according to the present embodiment, since the shape of the components constituting the ice-making evaporator 1 is simple and the manufacturing process is simple, manufacturing costs can be reduced.

In the step S130 of forming inspection target spaces A1, C1, A2, and C2, after arranging the main body space-dividing wall 310 in step S131, a guide wall 330 is assembled to the main body space-dividing wall 310 through the first coupling hole 111 in step S132, and a heat exchange space-dividing wall 320 is assembled to the guide wall 330 in step S133.

In the steps S132 and S133 of assembling a main body space-dividing wall 310, a guide wall 330, and a heat exchange space-dividing wall 320, as described above, a first process of assembling the guide wall 330 to the main body space-dividing wall 310 by correspondingly coupling a first dividing wall coupling groove 331*a* to a first guide wall coupling groove 311 and a second process of assembling the heat exchange space-dividing wall 320 to the guide wall 330 by correspondingly coupling a second dividing wall coupling groove 331*b* to a second guide wall coupling groove 321 may be sequentially performed.

Therefore, according to the present embodiment, since the guide wall 330 and the heat exchange space-dividing wall 320 can be easily assembled to the main body space-dividing wall 310 placed inside the main body part 110 through the coupling hole 111 of the main body part 110, the manufacturing convenience and assimilability of the ice-making evaporator 1 can be improved.

Referring to FIGS. 15 and 5 together, in the step S130 of forming inspection target spaces A1, C1, A2, and C2, after the main body space-dividing wall 310, the guide wall 330, and the heat exchange space-dividing wall 320 are assembled with each other in steps S132 and S133, the ice-making member 200 is arranged on the side of the evaporator main body 100 so that the heat exchange space-dividing wall 320 is positioned in the heat exchange space C of the ice-making member 200 in step S134.

Thereafter, in the step S130 of forming inspection target spaces A1, C1, A2, and C2, the relative positions of the ice-making member 200 and the evaporator main body 100 are adjusted so that the heat exchange space-dividing wall 320 divides the heat exchange space C into a first heat exchange space C1 and a second heat exchange space C2 in step S135.

In addition, in the step S130 of forming inspection target spaces A1, C1, A2, and C2, the first main body space A1 and the first heat exchange space C1 are fluidly connected to form first inspection target spaces A1 and C1, and the second main body space A2 and the second heat exchange space C2 are fluidly connected to form second inspection target spaces A2 and C2 in step S136.

By the above-described step, inspection target spaces A1, C1, A2, and C2 may be formed in step S130.

Referring back to FIGS. 4 and 5 together with FIG. 14, in the step S100 of providing an evaporator assembly 100, 200, 300, after the inspection target spaces A1, C1, A2, and C2 are formed in step S130, the evaporator main body 100, the ice-making member 200, and a separation member 300 are combined in step S140.

In this case, in the step S140 of combining the evaporator main body 100, the ice-making member 200, and the separation member 300, a separation cap 140 is arranged inside the main body part 110 through the first opening 113, and then a first closing cap 120 equipped with a refrigerant inlet pipe 122, a heat gas inlet pipe 124, and a discharge pipe 126 may be installed at one end of the main body part 110.

In addition, in the step S140 of combining the evaporator main body 100, the ice-making member 200, and the separation member 300, a partition member 150 may be arranged between the main body spaces A1 and A2 and a circling space B through the second opening 115 of the main body part 110.

Then, in the step S140 of combining the evaporator main body 100, the ice-making member 200, and the separation member 300, the evaporator main body 100, the ice-making member 200, the separation member 300, the first closing cap 120, the separation cap 140, and the partition member 150 may be combined with each other.

In this case, the step of combining the evaporator main body 100, the ice-making member 200, the separation member 300, the first closing cap 120, the separation cap 140, and the partition member 150 may be performed by any one of a laser welding process, a brazing welding process using welding powder or welding paste, and a high-frequency welding process.

In the present embodiment, since the evaporator assembly 100, 200, 300 is made of several members, and the edges of the members that are coupled to each other include straight lines and curves, the step of combining the evaporator main body 100, the ice-making member 200, the separation member 300, the first closing cap 120, the separation cap 140, and the partition member 150 may be performed by a brazing welding process that can combine members having somewhat curved shapes at once.

In this case, the step of arranging the partition member 150 inside the main body part 110 and the step of coupling the partition member 150 and the main body part 110 to each other may not be performed in the step of providing an evaporator assembly 100, 200, 300 in step S100, but may be performed separately in the step S200 of inspecting whether the inspection target spaces A1, C1, A2, and C2 are isolated.

The evaporator assembly 100, 200, 300 may be provided by the above-described step S100.

Meanwhile, referring back to FIG. 13, in the method for manufacturing an ice-making evaporator according to an exemplary embodiment of the present invention, after the evaporator assembly is provided in step S100, whether the inspection target spaces are isolated is inspected in step S200. In this case, checking whether the two spaces are isolated means inspecting whether the two spaces are fluidly isolated from each other.

Referring to FIG. 16 together with FIG. 12, in the step S200 of inspecting whether the inspection target spaces A1, C1, A2, and C2 are isolated, the first and second holes 153*a* and 153*b* of the partition member 150 disposed inside the main body part 110 are closed by inserting an inspection member 2 through the open second opening 115 of the main body part 110 in steps S210 and S220.

In this case, as described above, the step S210 of arranging the partition member 150 may be performed first in the same step as the step S140 of combining the evaporator main body 100, the ice-making member 200, and the separation member 300 (see FIG. 14).

After that, in the step S200 of inspecting whether the inspection target spaces A1, C1, A2, and C2 are isolated, the characteristics of the inspection target spaces A1, C1, A2, and C2 may be checked in step S230. In this case, the inspection target spaces A1, C1, A2, and C2 to be checked may be the first inspection target spaces A1 and C1 and the second inspection target spaces A2 and C2 formed in the previous step S130 (refer to FIG. 14).

Referring to FIG. 17 together with FIG. 12, according to the present embodiment, in the step S230 of checking the characteristics of the inspection target spaces A1, C1, A2, and C2, a predetermined fluid, for example compressed air, is injected into any one of the first inspection target spaces A1 and C1 and the second inspection target spaces A2 and C2 in step S231, and the state of the injected fluid is checked in step S232.

In the present embodiment, in the step S232 of checking the state of the injected fluid, whether the injected fluid leaks into any one of the first inspection target spaces A1 and C1 and the second inspection target spaces A2 and C2 may be checked.

Referring back to FIG. 16 together with FIG. 12, in the step S200 of inspecting whether isolated, after checking the characteristics of the inspection target spaces A1, C1, A2, and C2 in step S230, based on the identified characteristics, it is determined whether the first inspection target spaces A1 and C1 and the second inspection target spaces A2 and C2 are isolated from each other in step S240. In this case, the step S240 of determining whether isolated may be performed as described above with reference to FIG. 12, and a detailed description thereof will be omitted.

Meanwhile, in the present embodiment, the characteristics identified in the step S230 of checking the characteristics of the inspection target spaces A1, C1, A2, and C2 are whether the fluid injected into the inspection target spaces A1, C1, A2, and C2 is leaked, but this is only an example, and the characteristics of the inspection target spaces A1, C1, A2, and C2 are not limited thereto.

For example, the characteristics identified in the step S230 of checking the characteristics of the inspection target spaces A1, C1, A2, and C2 may be a pressure change or a temperature change of a fluid injected into any one of the inspection target spaces A1, C1, A2, and C2.

By the above-described step, whether the inspection target spaces A1, C1, A2, and C2 are isolated may be inspected in step S200.

Referring to FIG. 13 together with FIGS. 5 and 12, in the method for manufacturing an ice-making evaporator according to an exemplary embodiment of the present invention, after whether the inspection target spaces A1, C1, A2, and C2 are isolated is inspected in step S200, the open second opening 115 of the evaporator assembly 100, 200, 300 is closed with the second closing cap 130 based on the result obtained in the step S200 of inspecting whether isolated, in step S300.

In this case, in the step S300 of closing the evaporator assembly 100, 200, 300, when the result obtained in the step S200 of inspecting whether isolated includes information that the first inspection target spaces A1 and C1 and the second inspection target spaces A2 and C2 are not completely isolated from each other, it is determined that the evaporator assembly 100, 200, 300 is defective, and the step of discarding or repairing may be additionally performed.

Accordingly, according to the method for manufacturing an ice-making evaporator according to an exemplary embodiment of the present invention, it is possible to prevent the manufacture of an ice-making evaporator with poor ice-making performance because the inner space is not completely partitioned, that is, a defective product.

Meanwhile, in the step S300 of closing the evaporator assembly 100, 200, 300, when the result obtained in the step S200 of inspecting whether isolated includes information that the first inspection target spaces A1 and C1 and the second inspection target spaces A2 and C2 are completely isolated from each other, an inner second closing cap 130 is placed inside the main body part 110, an outer second closing cap 130 is installed at an end of the main body part 110, and the inner and outer second closing caps 130 are combined with the main body part 110.

In this case, at least one of the step of combining the inner second closing cap 130 and the main body part 110 and the step of combining the outer second closing cap 130 and the main body part 110 may be performed by any one of a laser welding process, a brazing welding process using welding powder or welding paste, and a high-frequency welding process.

In this case, in the present embodiment, the step of combining the inner second closing cap 130 may be performed by a high-frequency welding process in consideration of the need to prevent damage to the welded part combined by the brazing welding process in the previous step and the fact that the inner second closing cap 130 is placed inside the main body part 110.

In addition, in the present embodiment, the step of combining the outer second closing cap 130 may be performed by laser welding in consideration of the fact that the part where the main body part 110 and the outer second closing cap 130 are coupled to each other is exposed to the outside.

The opening 115 of the evaporator assembly 100, 200, 300 may be closed by the above-described step S300.

As described above, according to the method for manufacturing an ice-making evaporator according to an exemplary embodiment of the present invention, the ice-making evaporator shown in FIGS. 1 to 12 may be manufactured. However, in addition to the ice-making evaporator shown in FIGS. 1 to 12, the method for manufacturing an ice-making evaporator according to an exemplary embodiment of the present invention may be applied to manufacture another ice-making evaporator configured that refrigerant circulates through a plurality of spaces that are partitioned.

Although exemplary embodiments of the present invention have been described above, the idea of the present invention is not limited to the embodiments set forth herein. Those of ordinary skill in the art who understand the idea of the present invention may easily propose other embodiments through supplement, change, removal, addition, etc. of elements within the scope of the same idea, but the embodiments will be also within the idea scope of the present invention.

What is claimed is:

1. An ice-making evaporator, comprising:

a main body configured to include a first space extending in a first direction to allow refrigerant to flow;

a first wall extending in the first direction and configured to partition the first space into a second space and a third space;

an ice-maker extending in a second direction different from the first direction and configured to include a fourth space that is in fluid communication with the first space;

a second wall extending in the second direction and configured to divide the fourth space into a fifth space in fluid communication with the second space and a sixth space in fluid communication with the third space;

a first path connected to the second space and configured to make the refrigerant flow into the second space; and a second path connected to the third space and configured to make the refrigerant flowing in the third space flow out, wherein a seventh space for allowing the refrigerant to flow from the second space to the third space is provided in the main body, and wherein a partition is provided between the first space and the seventh space to divide the first space and the seventh space and includes a first hole connecting the second space and the seventh space so that the second space and the seventh space are in fluid communication, and a second hole connecting the third space and the seventh space so that the third space and the seventh space are in fluid communication.

2. The ice-making evaporator of claim 1, wherein the partition comprises:

a body configured to partition the first space and the seventh space, wherein the first hole and the second hole are formed; and an extension extending from a circumference of the body toward the seventh space and configured to have an outer surface in contact with an inner wall of the main body.

3. The ice-making evaporator of claim 1, wherein a third hole in fluid communication with the first space is formed in the main body, and wherein the ice-maker is coupled to the third hole.

4. The ice-making evaporator of claim 1, wherein the ice-maker comprises a ice-making part in a cylindrical shape and a bottom part provided at an end of the ice-making part to close an end of the fourth space, wherein the bottom part is convex outward.

5. The ice-making evaporator of claim 1, wherein the ice-maker extends in a direction perpendicular to the first direction.

6. The ice-making evaporator of claim 1, wherein the first wall and the second wall are configured to be arranged in parallel on the same plane.

7. The ice-making evaporator of claim 1, further comprising:

a third wall coupled to the first wall, wherein the third wall comprises a first guide part disposed in the second space to guide the refrigerant flowing from a first end to a second end of the second space to pass through the fifth space.

8. The ice-making evaporator of claim 7, wherein the third wall and the first wall are configured to be arranged perpendicular to each other.

9. The ice-making evaporator of claim 7, wherein the third wall further comprises:

a second guide part disposed in the third space to guide the refrigerant flowing from a first end to a second end of the third space to pass through the sixth space.

10. The ice-making evaporator of claim 7, wherein the third wall further comprises:

a third guide part disposed in the fourth space to partition the fifth space into a eighth space and a ninth space.

11. The ice-making evaporator of claim 10, wherein the third guide part is configured to extend along the fourth space to guide the refrigerant flowing in the fifth space in the second direction.

12. The ice-making evaporator of claim 10, wherein a fourth hole configured to connect the eighth space and the ninth space to be fluidly communicated is formed in the third guide part.

13. The ice-making evaporator of claim 12, wherein the fourth hole is located biased toward an end of the ice-maker.

14. The ice-making evaporator of claim 7, wherein a first groove to which the third wall is coupled is formed at a side of the first wall in the first direction, and wherein a second groove configured to be correspondingly coupled to the first groove is formed at a first end of the third wall toward the first space.

15. The ice-making evaporator of claim 7, wherein the second wall is coupled to the third wall.

16. The ice-making evaporator of claim 15, wherein a third groove to which the third wall is coupled is formed at an end of the second wall toward the first space, and wherein a fourth groove configured to be correspondingly coupled to the third groove is formed at a second end of the third wall.

17. The ice-making evaporator of claim 1, wherein the second and third spaces extend parallel to each other, and wherein the seventh space is located at an end of the first space.

18. The ice-making evaporator of claim 1, further comprising:

a third path connected to the second space and configured to make heated gas flow into the second space.

19. The ice-making evaporator of claim 1, wherein the ice-maker is provided in plurality, and wherein the plurality of ice-makers are configured to be arranged along the first direction.

* * * * *